United States Patent [19]

Liu

[11] Patent Number: 4,766,675
[45] Date of Patent: Aug. 30, 1988

[54] ANGLE MEASURING INSTRUMENT

[76] Inventor: Bao-Shen Liu, 3rd Fl., No. 20, Alley 6, Lane 190, Te Hsing E. Rd., Shih Lin District, Taipei, Taiwan

[21] Appl. No.: 34,033

[22] Filed: Apr. 1, 1987

Related U.S. Application Data

[63] Continuation-in-part of Ser. No. 872,589, Jun. 10, 1986, abandoned.

[51] Int. Cl.$^4$ ............................................. B43L 7/00
[52] U.S. Cl. .................................... 33/529; 33/534; 33/455; 33/456
[58] Field of Search ............... 33/456, 430, 415, 416, 33/421, 424, 426, 452, 454, 455, 459, 463, 481, 403, 534, 529, 173, 169 R, 412, 21.3

[56]     References Cited
U.S. PATENT DOCUMENTS

| | | | |
|---|---|---|---|
| 685,372 | 10/1901 | Duncan | 33/456 |
| 2,090,835 | 8/1937 | Gardham | 33/455 |
| 2,310,276 | 2/1943 | Bilz | 33/169 R X |
| 2,607,121 | 8/1952 | Wiedebusch | 33/455 |
| 2,735,184 | 2/1956 | Chamberlain | 33/455 |
| 3,009,250 | 11/1961 | Schock | 33/388 |
| 4,034,943 | 7/1977 | Freeman | 33/474 X |

FOREIGN PATENT DOCUMENTS 1073756  4/1956  Fed. Rep. of Germany ........ 33/455

Primary Examiner—Harry N. Haroian
Attorney, Agent, or Firm—Townsend and Townsend

[57]     ABSTRACT

An angle measuring instrument comprises, a multi-sided plate member which includes a first side and a second side that form an acute angle therebetween when they intersect, a third straight side that forms with the second side an obtuse angle when they intersect, and a graduated semi-circular region. A first measuring arm is pivoted to the plate member at the center of the semi-circular region, a second measuring arm is pivoted to the plate member at a point near the acute angle outside the circular region, and a third measuring arm is pivoted to the first and second measuring arms to form a parallelogram linkage with the plate. The second, and third sides of the plate member serve as measuring sides in cooperation with the measuring arms, thereby diversifying the application of the instrument.

3 Claims, 5 Drawing Sheets

ANGLE MEASURING INSTRUMENT

This application is a continuation-in-part application of U.S. patent application Ser. No. 06/872,589 filed on June 10, 1986 which is abandoned.

BACKGROUND OF THE INVENTION

This invention relates to an angle measuring instrument and particularly to an angle measuring instrument which has two measuring arms pivoted to a protractor plate and an additional arm pivoted to the two measuring arms, more particularly to one having a graduated plate member of specific configuration with its sides being used as measuring sides.

The angle measuring instrument of the type described above is disclosed in U.S. Pat. Nos. 2,090,835 to Gardhman, 2,607,121 to Wiedebusch and 2,735,184 to Chamberlain and German Pat. No. 1073756 to Nurchis. However, the constructions of the instruments disclosed in these patents are quite different from the present invention except for Nurchis' instrument which is deemed more relevant. The Nurchis' instrument includes a substantially semi-circular protractor plate and three measuring arms forming a parallelogram with the plate. Although the Nurchis' construction is simple and is suitable for measuring angles of a variety of shapes, there is a drawback in that the Nurchis' instrument can not measure an angle of an object which has therein an obstruction that prevents the two pivoted measuring arms of Nurchis from extending into the angle to be measured. An example of such an angle is that formed at a truncated corner, or that formed by two planes or two edges which incline with one another but do not intersect one another, and a third plane or edge intersects the two planes or edges near where the corner of the planes or edges is truncated.

Wiedebusch's instrument can be applied to measure the above described angles. However, Wiedebusch's construction is more complicated than Nurchis, including a protractor plate and four pivoted measuring arms which form a linkage system. Wiedebusch's construction requires complicated processing steps to obtain a precision measuring linkage system.

SUMMARY OF THE INVENTION

An object of the present invention is to provide a precision angle measuring instrument of simple construction which is convenient for measuring angles of various shapes, even those which can not be measured easily with prior angle measuring instruments and which still can be manufactured more easily than conventional angle measuring instruments.

Another object of the present invention is to provide a precision angle measuring instrument which can be laid easily on angling members to obtain an accurate result.

The present invention provides an angle measuring instrument which comprises, a plate member of specific configuration having a plurality of sides which include a first side and a second side that form an acute angle therebetween when they intersect, and a third straight side that forms with the second side an obtuse angle when they intersect. The plate member further has on one of its surfaces a graduated semi-circular region confined by a curved bounding end and a diametral bounding end lying adjacent to the first side. The instrument further comprises a first measuring arm pivoted to the plate member at a first point centered in the semi-circular region and having a portion extending in the semi-circular region as an indication means, a second measuring arm pivoted to the plate member at a second point near the acute angle outside the circular region, and a third measuring arm pivoted to the first and second measuring arms at a third point and a fourth point respectively. The second and third sides of the plate member serve as measuring sides in cooperation with the measuring arms to measure different angles which can be measured easily by the conventional angle measuring instruments.

In one aspect of the invention, the second side intersects the first and third sides, the first side is parallel with the diametral bounding end, a fourth side is perpendicular to the first side, and the second side is parallel with the first side.

In another aspect of the invention, the angle measuring device further includes a longitudinal seat means to be attached detachably to the plate member, the seat means having at its top side a longitudinal groove for receiving one side of the plate, and a fastening means to hold the plate member in the groove. Certainly, the seat means may further have at its top side a transverse groove for receiving one of the measuring arms, and may have at its bottom side a further longitudinal groove by which the seat means can ride on a curved surface or a pipe.

In still another aspect of the invention, a pivot means is provided for pivoting one of the measuring arms to the plate member, including a first headed pin fixed to the plate and having a threaded axial throughhole therein and a truncated cone-shaped head which has a shoulder formation abutting against the plate and a bevelled face extending into and abutting with the measuring arm, and a second headed pin which is threaded into the throughhole and has a head with a peripheral flange clamping the first measuring arm against the bevelled face.

The present exemplary preferred embodiment will be described in detail with reference to the following drawings, in which:

DETAILED DESCRIPTION OF THE PREFERRED EMBODIMENT

Figure 1:
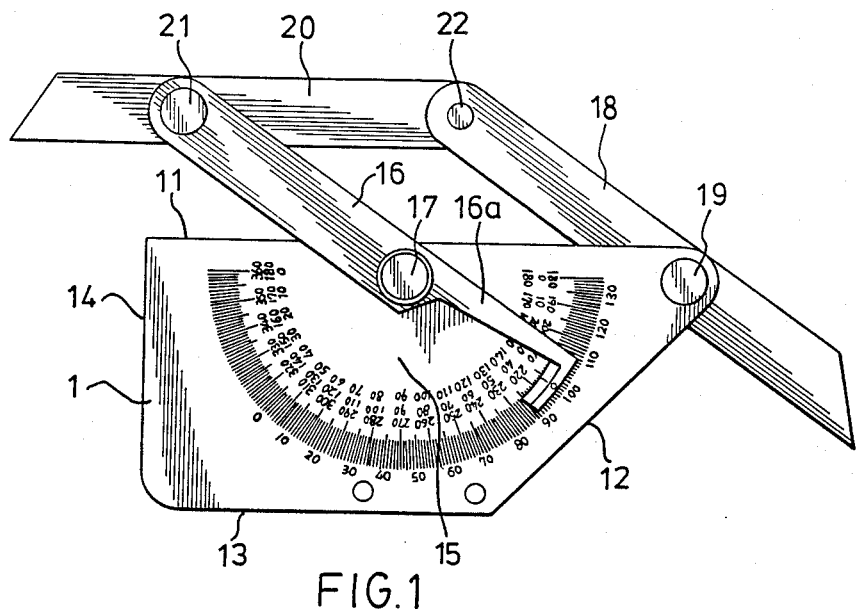
FIG. 1 is a plan view of a preferred embodiment of an angle measuring instrument.

Referring to FIG. 1, a preferred embodiment of an angle measuring member according to the present invention is shown, having a multi-sided plate member 10 which has a first straight side 11 and a second straight side 12 that form an acute angle therebetween, a third straight side 13 forms with the second side 12 an obtuse angle and is parallel to the first side 11, and a fourth straight side 14 perpendicular to the first and third sides 11 and 13. On one face of the plate member 10 is a graduated semi-circular region 15 defined by a curved bounding end and a diametral bounding end. The diametral bounding end is adjacently parallel with the first side 11.

A first measuring arm 16 is pivoted to the plate member 10 at the center 17 of the semi-circular region 15 and having a portion 16a extending into the semi-circular region 15 as an indication means. A second measuring arm 18 is pivoted to the plate member 10 at a second point 19 near the acute angle outside the circular region 15. A third measuring arm 20 is pivoted to the first and second arms at points 21 and 22 respectively.

Preferably, the measuring arms 16, 18 and 20 are straight arm members and arranged such that the distance between the first and second points 17 and 19 are equal to that between the third and fourth points 21 and 22, and the distance between the first and third points 17 and 21 are equal to that between the second and fourth points 19 and 22. The second arm 18 has a free end portion 18a extending beyond the second point 19 serving as a measuring portion to cooperate with the second side 18a.

Figure 3:
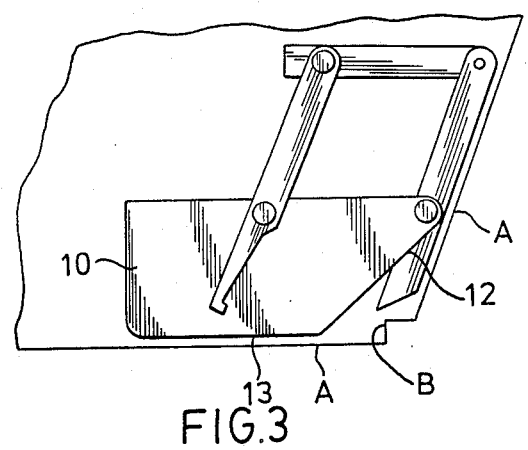
FIGS. 3 and 4 show the applications of the instrument in the measurement of angles with obstructions.
Figure 4:
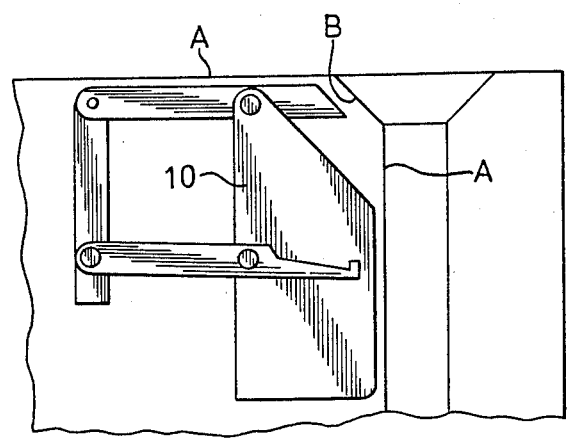

The particular configuration of the plate member 10 renders the instrument capable of measuring a variety of angles including those which can not be measured by Nurchis' instruments as well as being manufactured more easily than Wiedebusch's instrument. The second, third and fourth sides 12, 13 and 14 may serve as measuring elements in the application of the instrument 1. FIGS. 3 and 4 show the application of the instrument in the measurement of two exemplary angles each formed between two angling members A of which the corner is truncated and is provided with an obstruction B across the corner. This obstruction B prevents the corner of the pivoted pair of measuring arms 18 and 20 or measuring arms 16 and 20 from extending properly into the angle; that is to say, these pairs of measuring arms can not be applied to the measurement of these angle. In this case, the third side 13 serves as a measuring side and cooperates with the second measuring arm 18 to effect measurement and the second side 12 avoids interference with the obstruction B.

Figure 2:
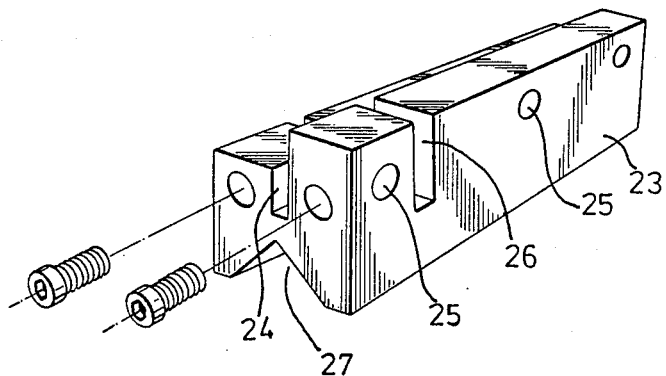
FIG. 2 is a perspective view of a seat means.
Figure 5:
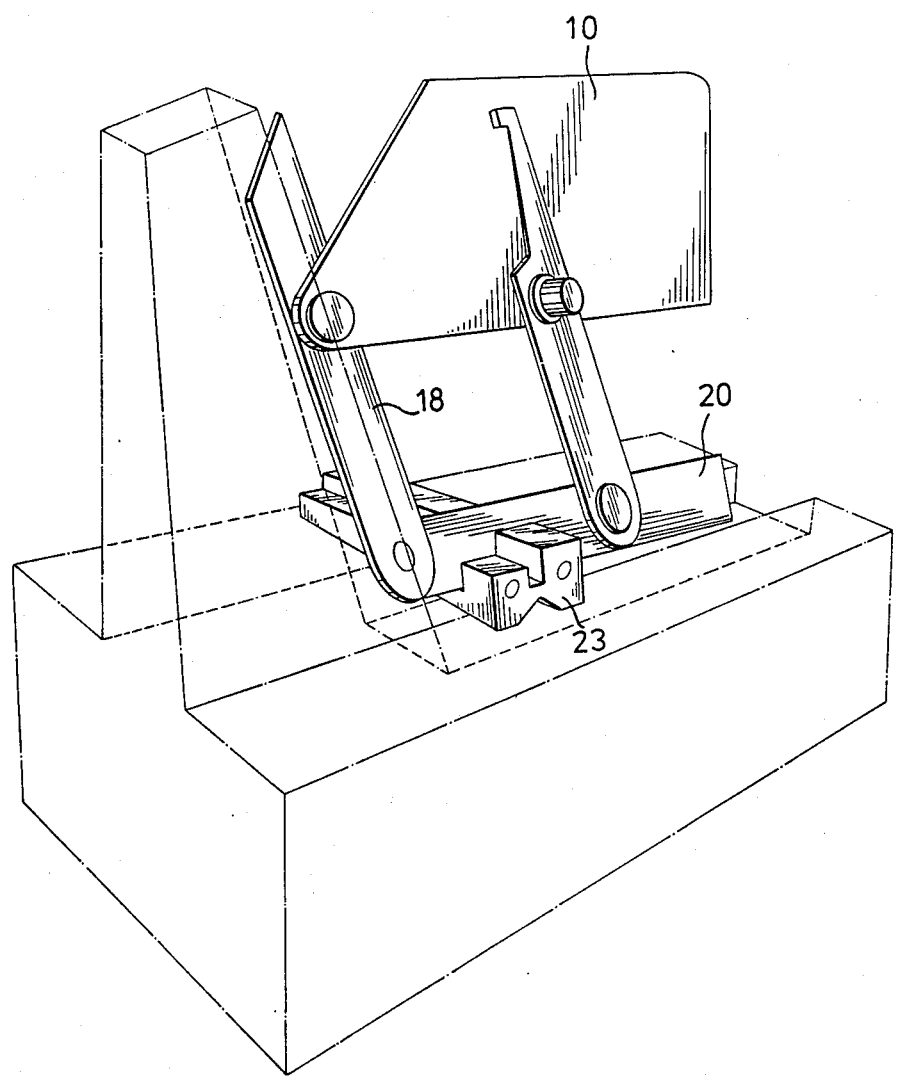
FIGS. 5 and 6 show the application of the instrument and the seat means in the measurement of different angles.
Figure 6:
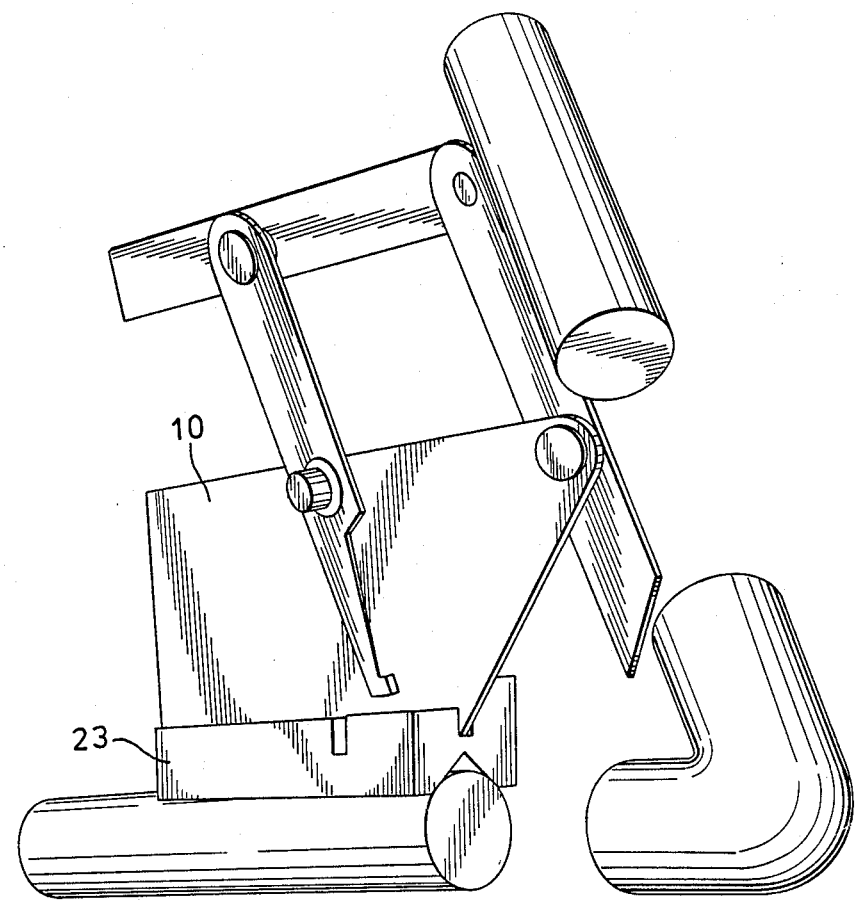

Referring to FIG. 2, there is a longitudinal seat means 23 which is to be connected detachably to the angle measuring instrument. With the seat means 23, the instrument can stand itself on either a flat surface or curved surface during measurement. The longitudinal seat 23 is an elongated solid body which has at its top side a longitudinal groove 24 with a groove width slightly wider than the thickness of the plate member 10 so that one side of the plate member 10 can be snugly received in the groove 24. Screw holes 25 are provided in the seat 23 for attachment of screw fasteners to secure the plate member 10 to the seat 23. A transverse groove 26 is also provided at the top side of the seat means 23 for receiving one of the arms 16, 18 or 20 as desired. At the bottom side of the seat 23 is another longitudinal groove 27 of substantially V-shaped cross-section. With the groove 27, the seat 23 can ride on a pipe or a curved surface so that the measuring instrument can be in a proper measuring position relative to the angling members. FIGS. 5 and 6 show the application of the instrument 1 and the seat member 23 in the measurement of different angles.

Figure 8:
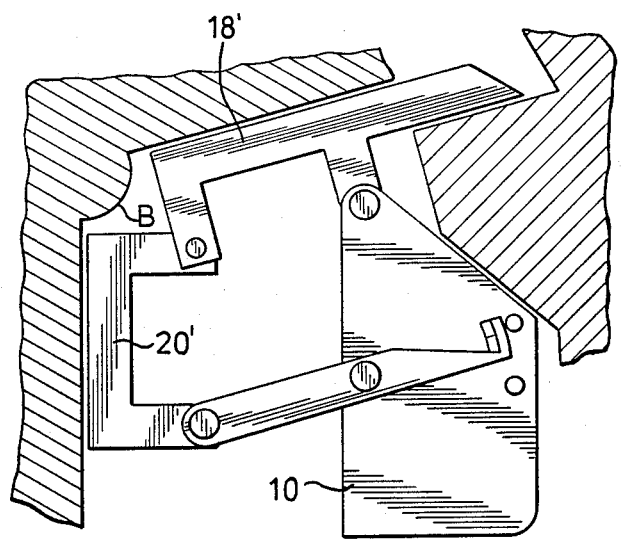
FIG. 8 shows the application of the instrument of FIG. 7.
Figure 7:
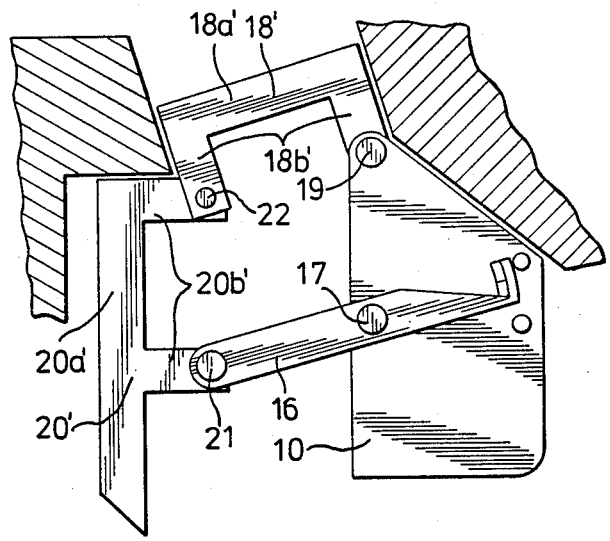
FIG. 7 is a plan view of another preferred embodiment of an angle measuring instrument according to the invention.

Referring to FIGS. 7 and 8, another embodiment of the angle measuring instrument is shown in which the elements similar to that of the previous embodiment are represented by the same reference numerals. In this embodiment, the second and third measuring arms 18 and 20 are replaced by two bent measuring arms 18' and 20'. The bent measuring arm 18' has a measuring straight arm portion 18a' and two branch portions 18b' extending perpendicularly from the straight arm to be pivoted at the points 19 and 22. The bent measuring arm 20' has a measuring stright arm portion 20a' and two branch portions 20b' extending perpendicularly from the straight arm 20a' to be pivoted at the points 21 and 22 respectively. As shown in FIG. 8, the bent measuring arms 18' and 20' provide an advantage in that they can be applied to measure an angle with an obstruction.

Figure 9:
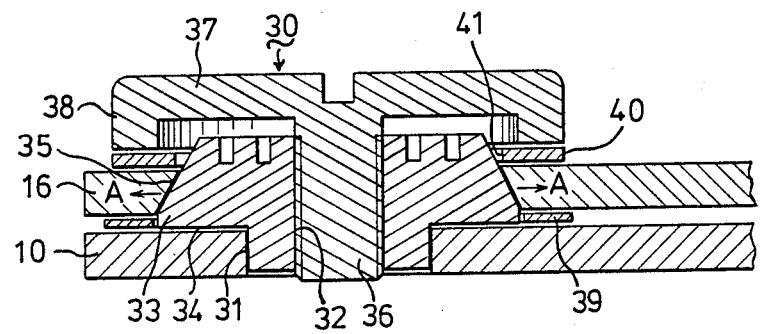
FIG. 9 is a sectional view of a pivot member used in the present invnetion.

There is further provided a pivot means 30 for pivoting any one of the measuring arms 16, and 18 or for pivoting the two measuring arms 18 and 20. As shown in FIG. 9, the pivot means 30 includes a first headed pin 31 fixed to the plate 10 and having a threaded axial throughhole 32 therein and a truncated cone-shaped head 33 which has a shoulder formation 34 abutting against the plate and a bevelled face 35 extending into and abutting with the measuring arm 16, and a second headed pin 36 which is threaded into the throughhole and has a head 37 with a peripheral flange 38 projecting towards the measuring arm 16 for clamping it against the bevelled face 35. Two packing rings 39 and 40 are disposed respectively between the plate member 10 and the measuring arm 16 and between the measuring arm 16 and the head 37 of the second pin 36. The packing ring 40 is provided with an opening 41 of rectangular shape so as to prevent the ring 40 from rotating when the arm 16 is turned. The plate member 10 is immobable relative to the headed pin 31. The measuring arm 16 is clamped by the flange 38 of the pin 36 against the bevelled face 35 so that the measuring arm is prevented from moving laterally, i.e. in the direction shown by arrow A when it is turned. This is advantageous for precise angle measurements.

With the invention thus explained, it is apparent that various modifications and variations can be made without departing from the scope of the present invention. It is therefore intended that the invention be limited as indicated in the appended claims.

What I claim is:

1. An angle measuring instrument comprising:
a plate member having a plurality of sides including a first straight side, a second bent side, a third bent side and a fourth side, said second side having two ends connected to said first and third sides, said first side and said second side intersecting and forming an acute angle therebetween, said third side intersecting said second side, forming an obtuse angle therebetween and being parallel to said first side, said fourth side being perpendicular to said first side, said plate member further including a surface having a graduated semi-circular region confined by a curved bounding end and a diametral bounding end, said diametral bounding end lying adjacent and parallel to said first side;
a first measuring arm pivoted to said plate member at a first point centered in said semi-circular region and having a portion extending in said semi-circular region as an indication means;

a second bent measuring arm pivoted to said plate member at a second point near said acute angle outside said semi-circular region;

a third bent measuring arm being pivoted to said first measuring arm at a third point and to said second measuring arm at a fourth point; and wherein said second and third arms each comprise a main straight measuring portion and two branch portions extending perpendicularly from said main straight portion, said branch portions providing said pivotal connection.

2. An angle measuring instrument comprising:

a plate member having a plurality of sides including a first side, a second side, a third straight side said first side and said second side intersecting and forming an acute angle therebetween, said third straight side intersecting said second side, forming an obtuse angle therebetween said plate member further including a surface having a graduated semi-circular region confined by a curved bounding end and a diametral bounding end, said diametral bounding end lying adjacent to said first side;

a first measuring arm pivoted to said plate member at a first point centered in said semi-circular region and having a portion extending in said semi-circular region as an indication means;

a second measuring arm pivoted to said plate member at a second point near said acute angle outside said semi-circular region; and a third measuring arm being pivoted to said first measuring arm at a third point and to said second measuring arm at a fourth point; and said angle measuring instrument further comprising a longitudinal seat means including a longitudinal solid body detachably attached to said plate member, said solid body having a top side including a first longitudinal groove for receiving one of said sides of said plate and a third groove transverse to said first longitudinal groove for receiving one of said measuring arms, a bottom side including a second longitudinal groove whereby said solid body can ride on a pipe or a curved surface, and fastening means to hold said plate member in said groove.

3. An angle measuring instrument comprising:

a plate member having a plurality of sides including a first side, a second side, a third straight side, said first side and said second side intersecting and forming an acute angle therebetween, said third straight side intersecting said second side, forming an obtuse angle therebetween, said plate member further including a surface having a graduated semi-circular region confined by a curved bounding end and a diametral bounding end, said diametral bounding end lying adjacent to said first side;

a first measuring arm pivoted to said plate member at a first point centered in said semi-circular region and having a portion extending in said semi-circular region as an indication means;

a second measuring arm pivoted to said plate member at a second point near said acute angle outside said semi-circular region; and a third measuring arm pivoted to said first measuring arm at a third point and to said second measuring arm at a fourth point; and said angle measuring instrument further comprising a pivot means for pivoting one of said measuring arms to said plate member, said pivot means including a threaded axial hole therein, a first headed pin affixed to said plate and including a truncated cone-shaped head having a shoulder formation abutting said plate, a bevelled face extending into and abutting said measuring arm, and a second headed pin threaded into said hole including a head having a peripheral flange clamping said first measuring arm against said bevel face.

* * * * *